Feb. 10, 1953 J. J. EBERLE 2,627,960
LOADING CONVEYER
Filed July 18, 1947 3 Sheets-Sheet 2
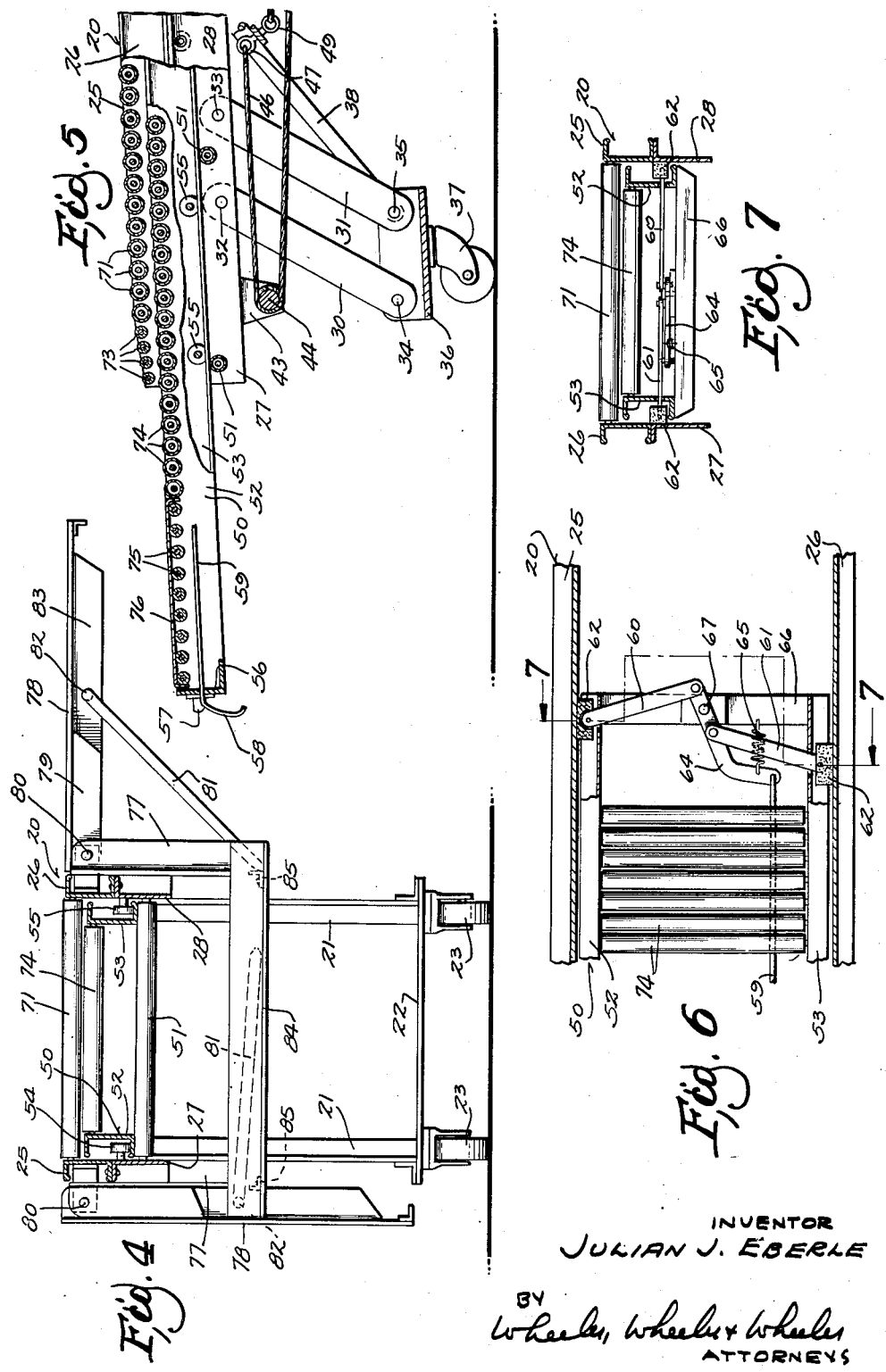
INVENTOR
JULIAN J. EBERLE
BY
Wheeler, Wheeler & Wheeler
ATTORNEYS

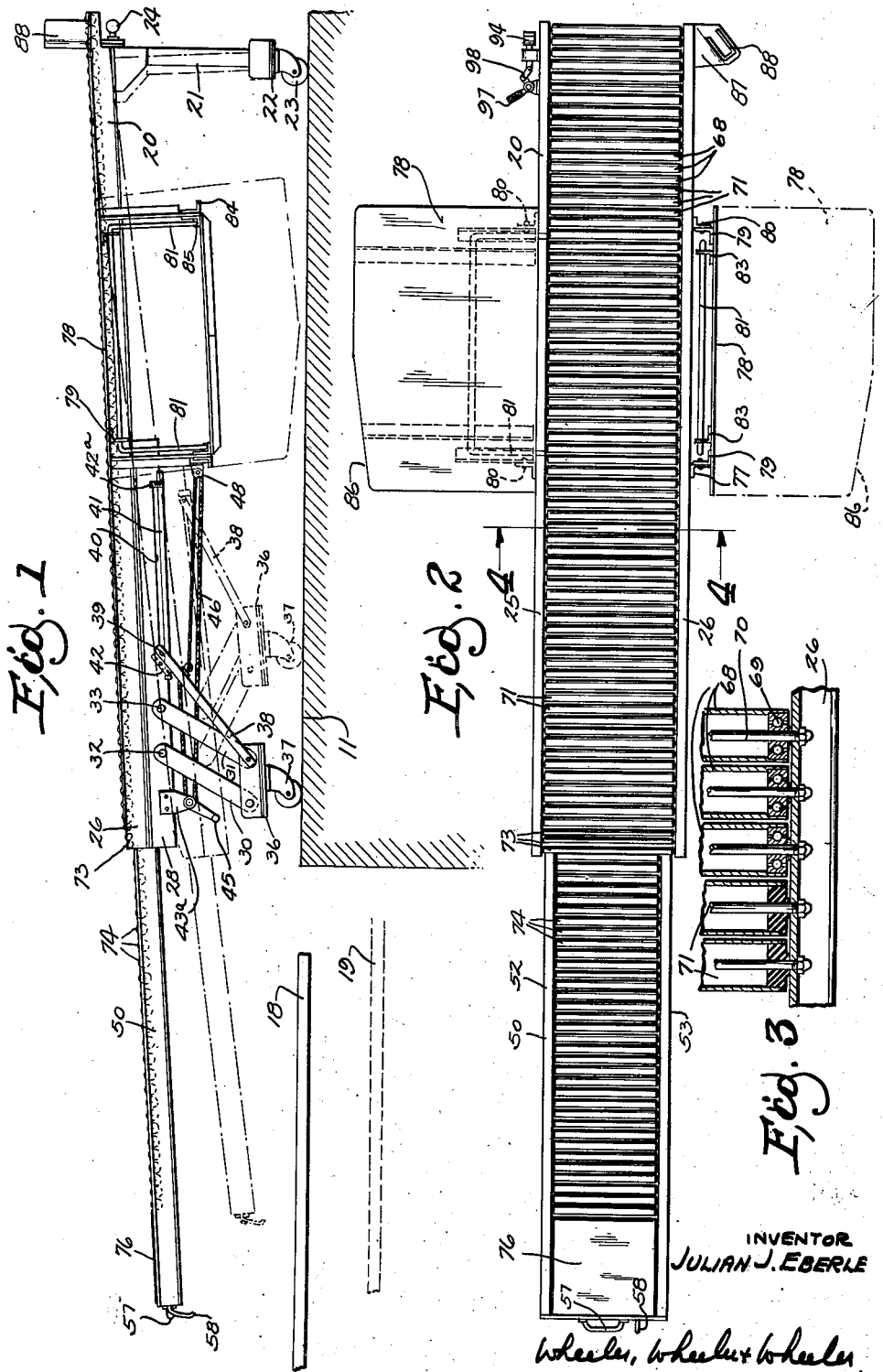

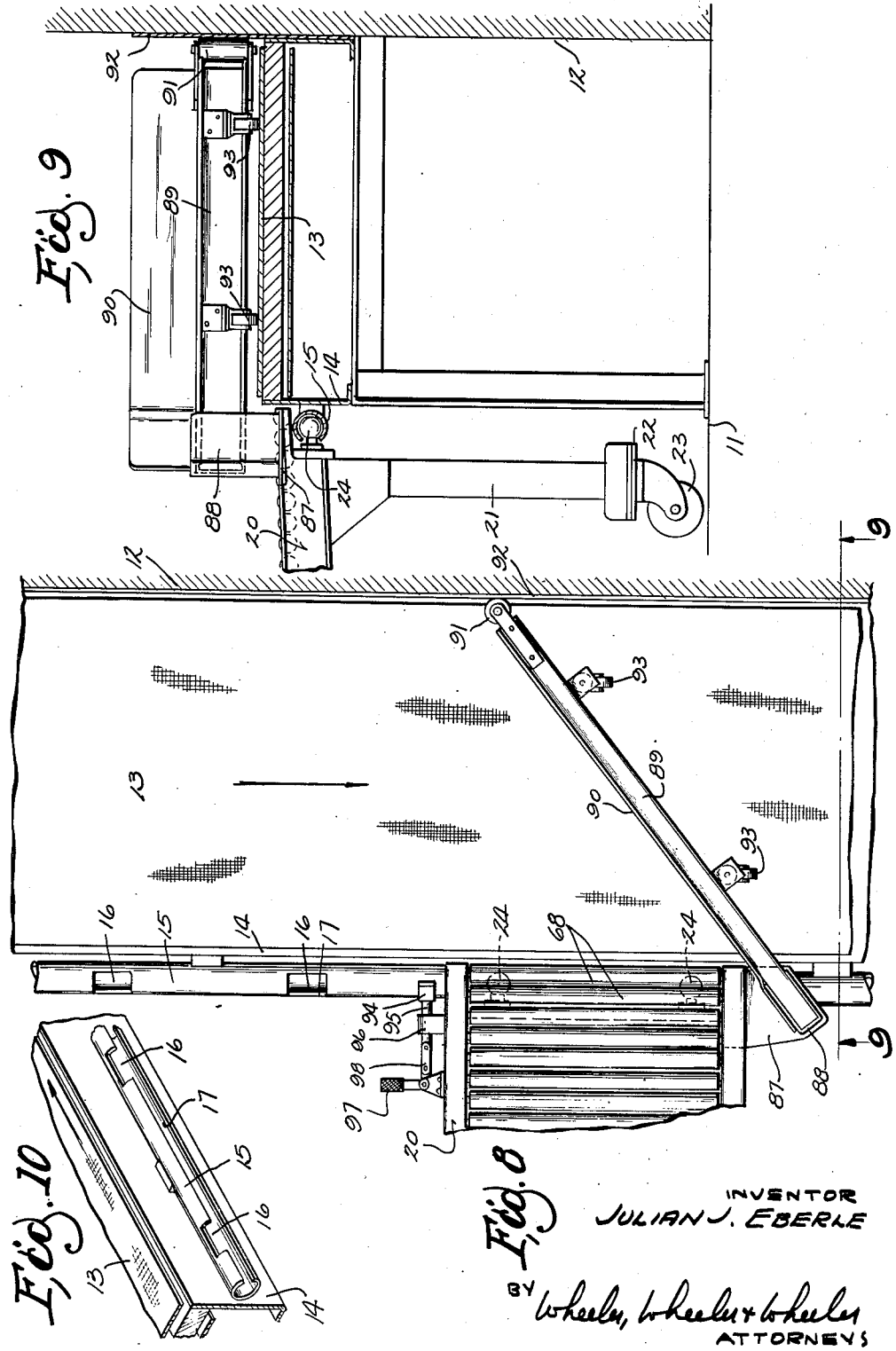

Patented Feb. 10, 1953

2,627,960

UNITED STATES PATENT OFFICE 2,627,960

LOADING CONVEYER

Julian J. Eberle, Wauwatosa, Wis., assignor to The Journal Company, Milwaukee, Wis., a corporation of Wisconsin Application July 18, 1947, Serial No. 761,778

20 Claims. (Cl. 193—35)

1

This invention relates to improvements in loading conveyors.

It is a primary object of the invention to provide a novel, simple and unusually serviceable conveyor for delivering bundles or packages from a loading platform on to the bed of a truck. More specifically, it is my purpose to provide a conveyor which is not only adjustable in position on the loading platform and adjustable as to height to service trucks with beds of differing heights, but is also telescopically adjustable as to length so that bundles may be discharged in any desired area of the truck bed without having the conveyor itself necessarily supported from such bed.

Purely by way of exemplification, my improved conveyor is described with particular reference to its use for delivering bundles of newspapers or other publications. It will, however, be evident that the conveyor is useful in other fields and, for a more particular indication of its advantages and objectives, reference is made to the following disclosure.

In the drawings:

Fig. 1 is a view in side elevation of a conveyor embodying the invention.

Fig. 2 is a view in plan of the conveyor shown in Fig. 1.

Fig. 3 is an enlarged detail view fragmentarily illustrating in horizontal section some of the rollers used in the conveyor.

Fig. 4 is an enlarged detail view of the conveyor in transverse section on the line 4—4 of Fig. 2.

Fig. 5 is an enlarged detail view in longitudinal section through a portion of the delivery end of the conveyor.

Fig. 6 is an enlarged fragmentary detail view in horizontal section through the rear end of the telescopically extensible portion of the conveyor.

Fig. 7 is a detail view taken in section on the line 7—7 of Fig. 6.

Fig. 8 is a fragmentary plan view showing the adjustable connection of the loading conveyor with the loading platform feeding conveyor.

Fig. 9 is a detail view taken in section on the line 9—9 of Fig. 8.

Fig. 10 is a fragmentary detail view in perspective showing the mounting provided on the feeding conveyor for attachment and adjustment of the loading conveyor.

The present device is particularly adapted for use on a loading platform 11 (Fig. 1) which may project from a building wall 12 (Fig. 9), along which extends the belt conveyor 13 (Figs. 8 and 9). I provide the frame 14 of the belt conveyor

2

13 with a support 15 comprising a slotted tube, one free margin of which is provided at intervals with notches 16 opening to the slot 17.

Trucks having beds 18, 19 of various heights are backed up to the platform 11. The loading conveyor is made to cooperate with the feeding conveyor 13 for delivering bundles from the canvas belt conveyor to the trucks.

For details of the loading conveyor per se, reference is made to Figs. 1 to 7 inclusive.

The loading conveyor frame 20 is supported at its rear end by legs 21 cross connected at 22 and provided with casters 23. The rear end of this conveyor may also be supported by ball headed connectors 24 in the manner hereinafter to be described.

The frame 20 comprises a pair of channels 25, 26 disposed along the sides of the conveyor back to back and shown in Fig. 4 and Fig. 7. The depth of the frame is increased near its forward end by the angle plates 27, 28 riveted beneath the channels as shown in Fig. 4 and Fig. 7. At each side of the forward end portion of the conveyor frame, there are parallel links 30, 31 pivoted to the angle plates 27, 28 at 32, 33 and pivoted at 34, 35 to a dolly 36 provided with a caster 37.

Also pivoted to the dolly 36 are the control links 38, the upper ends of which are provided with pins 39 (Fig. 1) riding in slots 40 formed by attaching a separate bar 41 to each of the angle plates 28 by means of brackets 42, 42a, which also serve as stops to limit the movement of the pin 39 in the slot 40.

The brackets 43, 43a depending from the angle plates 27, 28 (Figs. 1 and 5) support the shaft of a windlass 44 which is provided with a crank 45. A cable 46 is provided with several wraps around the windlass or drum 44. One end of the cable is connected to the control link 38 at 47. The other end of the cable extends about a pulley 48 fixed to the frame and back to a connection with a link at 49. Thus, by the rotation of crank 45, the control link may be moved to adjust its pin 39 from one end to the other of slot 40 thereby achieving any desired variation in height of the delivery end of the main conveyor frame 20 within the capacity of the device. The two extremes of adjustment are shown respectively in full and dotted lines in Fig. 1. If the links 30 and 31 are nearly upright as shown in the full line position, the delivery end of the conveyor frame will be at maximum height. If the links are collapsed to a nearly horizontal position as shown in dotted lines, the delivery end of the frame will be at minimum height.

In order that the bundles may be delivered over the bed of the truck to a point near its forward end, a telescopically extensible conveyor sub-frame 50 is provided. How the rollers are mounted on the main conveyor frame 20 and the sub-frame 50 for the support of the bundles will later be described.

As best shown in Figs. 4 and 5, the main frame 20 has its downwardly extending plate portions 27, 28 provided near their lower ends with transversely extending rollers 51 upon which the side channels 52, 53 of sub-frame 50 are supported. Channels 52, 53 are laterally spaced from each other and open oppositely. Also carried by the plates 27, 28 of the main frame 20 are guide rolls 54, 55 which engage respectively the horizontal lower flanges of channels 52, 53 to hold the sub-frame 50 to the rollers 51.

Means is provided for clamping sub-frame 50 in any position to which it may be adjusted. The front member 56 of the sub-frame is provided at 57 with a handle for convenient manipulation of the sub-frame by an operator on the truck. Adjacent this handle is a brake control handle 58 at the end of a rod 59 which extends longitudinally of the sub-frame to brake mechanism near the rear end thereof as best shown in Figs. 6 and 7.

The webs of channels 52 and 53 are slotted to receive the links 60, 61, each of which carries a brake shoe 62. The links are pivoted to a control lever 64 to which the rod 59 is connected. A tension spring 65 attached to the control lever and to the end member 66 of the sub-frame urges the control lever counterclockwise as viewed in Fig. 6, whereby the links 60, 61 are thrust outwardly to engage their respective shoes 62 with the end faces of plates 27, 28 of the main frame 20. The shoes are normally biased to friction engagement with the main frame, but such engagement is readily released by the operator's pull on the handle 58 of rod 59 to oscillate lever 64 against the tension of spring 65 to retract links 60 and 61 and the respective shoes. The lever 64 oscillates on a fulcrum end 67 fixed in the end member 66 of the sub-frame.

The main conveyor frame 20 and the sub-frame 50 are both provided with closely adjacent transverse rollers upon which work is supported for movement over the conveyor. For reasons hereinafter to be explained, some of these rollers are of special construction. A number of rollers 68 near the input end of the main frame 20 are provided with anti-friction bearings 69 for support from the cross rods 70 upon which such rollers are mounted. The purpose of the anti-friction bearings is to facilitate movement of the bundles on to the main conveyor frame. After the bundles arrive on the main conveyor frame, it is not desired that their progress on the main frame be too rapid. Accordingly, anti-friction bearings are omitted from the remaining rollers 71. Since the rollers 68 and 71 are relatively large in diameter, I provide at the delivery end of the main frame 20 a series of smaller rollers 73 set at progressively lower levels as shown in Fig. 5 to minimize the drop of the bundles from the rollers of the main frame to the rollers 74 on the sub-frame.

At the delivery end of the extension conveyor 50, I provide rollers 75 of somewhat smaller diameter so that over them I may, if desired, place the flanged plate 76, the upper surface of which will be flush with the level of roller 74 to provide a platform (Figs. 2 and 5) on which the bundles will come to rest, to be removed manually by the operator at the delivery end of the apparatus.

At each side of main frame 20, I may provide a pair of longitudinally spaced vertical angle irons 77 for the support of a table 78 which is provided on its lower surface with angle irons 79 (Figs. 1 and 4) pivotally connected to the vertical angle iron 77 by fulcrum bolts 80 upon which the table may be moved from the inoperative position shown at the left in Fig. 4 to an operative horizontal position such as is shown at the right in Fig. 4.

For supporting the table in its operative position, I provide a brace 81 made of wire pivoted at 82 to the reenforcing angles 83 on the under side of the table. The main frame is provided with cross pieces at 84 which extend to, and are connected with, the vertical angle 77. These cross pieces carry stops 85 against which the legs of the U-shaped brace 81 are releasably engaged, no more positive connection being required. To release the brace, the table 78 is lifted slightly to disengage the brace from the flange of the cross member 84, whereupon the table may be lowered to the position shown at the left in Fig. 4.

Because the conveyor slants from its receiving end toward its delivery end, the free margin of each of the tables is preferably beveled at 86 so that when the table is lowered, it will clear the floor in all conveyor positions.

The extensible conveyor may be used in any desired location, but when used with the belt conveyor previously described, it is preferably connected thereto by engaging the ball headed mounting device 24 with the split tube 15 in the manner shown in Fig. 9. This may involve lifting the entire conveyor frame slightly at its receiving end to enable the balls 24 to be introduced into the correspondingly spaced notches 16 in the split tube 15. When the balls enter the interior of the split tube through the notches, the conveyor may then be slid laterally to any desired position along the table 14 of the belt conveyor.

For receiving material from the conveyor belt 13, the conveyor frame 20 is provided at one or both of its receiving end corners with a bracket 87 provided with a channel-shaped seat 88 set obliquely with reference to the longitudinal axis of the frame 20 as best shown in Fig. 8. Into this bracket, I may set, when desired, a deflecting board 89, preferably having a metal face at 90. This board has a roller 91 mounted to bear against the wall plate 92. It is also provided with caster roller supports at 93 which ride directly on the moving belt 13. With the board 89 in place in socket 88, it is held in the desired position by the frictional thrust of conveyor belt 13 and yet it may be moved with the conveyor frame 20 to any desired position along the table on which belt 13 operates.

In any such position the deflector 89 will cause bundles moving on belt 13 to turn and move outwardly on to the rollers of frame 20. To minimize the resistance to such movement, the rollers 68 first encountered by the bundle are provided with anti-friction bearings as above described. The downward pitch of the conveyor frame 20 and its extension takes care of any further movement of the bundles, making further anti-friction bearings unnecessary. If the bundles are coming at such a rate that an excess number of bundles accumulates, an operator may deflect some of these on to the tables 78 for temporary storage. Otherwise, the bundles are passed by such operator downwardly along the main frame 20 and on to the extension frame 50. The operator placing the bundles in the truck will adjust the extension frame 50 to any desired extension and upon release by him of the brake control handle 58 the extension frame will automatically be locked in any position of adjustment.

Whether the extension conveyor frame 50 is extended or retracted, the entire lateral conveyor assembly may be adjusted along the slot of tube 15 to any desired position in the whole length of the belt conveyor 13. It is thereby adapted to service a number of trucks successively and it may be positioned accurately with respect to any truck regardless of the precise position in which such truck is backed to the platform. In any adjusted position of the lateral conveyor assembly, the main frame 20 may be locked to tube 15 by means of brake shoe 94 which is mounted on plunger 95, the plunger being reciprocable through the guide 96 by means of bell crank lever 97 and toggle link 98. Fig. 8 shows the toggle link straightened to engage the shoe 94 with tube 15. Fig. 2 shows the shoe retracted by the collapse of the toggle link 98.

It will be observed (Fig. 9) that when the ball 24 is engaged in the tube 15 the caster 23 at the receiving end of the lateral conveyor is lifted slightly from the floor. Thus the rollers at the receiving end of the conveyor depend for their position upon the engagement of frame 20 with tube 15. The two balls 24 (Fig. 8) hold the conveyor frame 20 securely at right angles to the tube and at the proper level with regard to the belt conveyor. The relative positions are maintained despite any angular adjustment of the conveyor frame 20, such frame being supported, while in use, by the casters 37 adjustably connected to its delivery end and the balls 24 which fix the position of its receiving end and preclude movement of the receiving end either vertically, outwardly or inwardly.

I claim:

1. In a conveyor, the combination with a first conveyor frame, of an extension conveyor frame telescopically slidable respecting the first conveyor frame, the first conveyor frame being provided with supporting rollers upon which the extension conveyor frame is wholly adjustably supported by the first conveyor frame and with co-acting rollers holding the second conveyor frame to the first mentioned supporting rollers for the full support of the extension frame in all positions of telescopic sliding movement thereon.

2. The combination set forth in claim 1 in further combination with a lock comprising a part movably mounted on one of said frames and engageable with the other of said frames and a handle in operative connection with the lock part for manipulation thereof.

3. The combination set forth in claim 1 in further combination with a brake member mounted on the extension frame and means guiding the brake member for lateral movement to and from engagement interiorly with the first frame, a handle for the operation of said brake member, and link means operatively connecting the handle with the brake member.

4. In a conveyor, the combination with a first conveyor frame provided with work-supporting rollers in a series extending from a work-receiving end to a work-delivering end of said frame, of an extension frame slidably nested respecting the first frame, the first frame being provided with ways upon which the extension frame is slidable between retracted and extended positions, said ways including supporting guide rolls near the delivery end of the first frame and below the second frame and co-acting rolls spaced upwardly from the guide rolls and engaging the upper side of the extension frame for holding it to said guide rolls against tilting when its free end is extended, and the extension frame having a series of work-supporting rollers adapted to receive work from the delivery end of the first frame.

5. The combination set forth in claim 4 in further combination with means for fixing the adjustment of the extension frame respecting the first frame and comprising a brake member, a support on the extension frame for the brake member and upon which the brake member is laterally movable to and from engagement with the first frame, an operating lever connected with the brake member for movement thereof, a handle at the delivery end of the extension frame and a link operatively connecting the handle with said lever.

6. The combination set forth in claim 4 in further combination with brake means for fixing the position of adjustment of the extension frame respecting the first frame, said brake means comprising a pair of thrust members for which said extension frame provides guide means near its rear end in which said thrust members are laterally movable outwardly in opposite directions into engagement with the first frame, brake shoes on said members, a lever pivoted to the extension frame and with which the respective thrust members are connected at opposite sides of the lever pivot and a rod extending from said lever forwardly toward the delivery end of the extension frame and provided with a handle for its manipulation, said lever being provided with a spring acting thereon in a direction to engage said brake shoes with said first frame.

7. A conveyor comprising a portable frame having wheeled supports and comprising spaced side members and work-supporting rollers spanning the space between said side members in a series extending from the receiving end to the delivery end of said frame, an extension frame comprising side members receivable between the side members of the first frame and disposed beneath said rollers, ways on the first frame for the telescopic sliding movement of the extension frame respecting the first frame, said ways comprising rollers upon which the side members of the extension frame are supported and complementary rollers holding the side members of the extension frame to the first mentioned rollers of said ways, the side members of said extension frame comprising oppositely opening channels in which said complementary rollers are disposed, said extension frame having work-supporting rollers spanning the space between its side members and adapted when extended beyond the delivery end of the first frame to receive work from the work-supporting rollers of the first frame.

8. The combination set forth in claim 7 in which the work-supporting rollers adjacent the delivery end of the extension frame are at a level lower than work supporting rollers remote from the delivery end of the extension frame, and a removable platform overlying said lower rollers to be disposed at the level of said remote rollers.

9. The combination set forth in claim 7 in which the work-supporting rollers adjacent the delivery of the first frame are progressively set at lower levels whereby to minimize the drop between the work-supporting rollers of the first frame and the rollers of the extension frame.

10. In a conveyor system, the combination with a first conveyor frame, of a second conveyor frame telescopically extensible respecting the first and dependent thereon for support and position, and supports for the combined frames and connected to the first frame at points spaced longitudinally of the first frame, one of said supports being adjustable as to its height.

11. In a conveyor, the combination with a main conveyor frame provided with a series of work-supporting rollers and with a work receiving end having a support, of a support adjustable as to height operatively connected with a work delivery end of said main frame, and an extension frame provided with work-supporting rollers and for which said main frame is provided with ways upon which the extension frame is telescopically slidable into and out from the main frame, said extension frame being wholly supported in said ways whereby the adjustment in height of the support for the delivery end of the main frame will be effective to adjust the height of the end of the projecting extension frame.

12. The combination set forth in claim 11 in which the adjustable support for the delivery end of the main frame comprises a wheeled carriage, struts pivoted to the carriage and to the main frame, and a brace member connected with the carriage, said brace member and main frame having slidably engaging portions, the portion on the main frame providing a guide means in which the engaged portion of the brace is slidable along the main frame, together with means for positioning the engaged portion of said brace means to effect the height adjustment of said struts.

13. The combination set forth in claim 11 in which the adjustable support for the delivery end of the main frame comprises a wheeled carriage, struts pivoted to the carriage and to the main frame, and a brace member connected with the carriage and having an end portion, said main frame being provided with guide means in which such end portion is slidable along the main frame, together with means for positioning the end portion of said brace means to maintain the height adjustment of said struts, said positioning means comprising a windlass having a handle, and an endless cable connected with the brace means and passing about the windlass and provided with a support upon said main frame remote from the windlass whereby said brace is between the windlass and support and rotation of the windlass will effect cable movement to move the brace member upon its guide means.

14. In a conveyor system, the combination with a first conveyor frame having a delivery end and conveyor means for supporting work for delivery over said end, of an extension frame provided with work supporting conveyor means arranged to receive the work from the delivery end of the first frame, the said means of the extension frame comprising rollers at its delivery end portion, together with a removable platform spanning said rollers at the delivery end of the extension frame, the work supporting conveyor means of said extension frame comprising work-supporting rollers disposed thereon with work supporting surfaces at a higher level than the rollers spanned by said platform and in the path of work advancing from said first conveyor frame to said platform, the said higher level rollers being adapted to discharge work onto said platform.

15. In a conveyor system, the combination with a first conveyor frame having work supporting rollers and an extension conveyor frame having work supporting conveyor means adapted to receive work from the rollers of the first frame, said first mentioned frame having near its delivery end rollers with their upper surfaces at progressively lower levels for effecting delivery of work from the rollers of the first frame to the conveyor means of the extension frame.

16. The device of claim 15 in which the first mentioned frame is provided with ways in which the extension frame is retractable and extensible, the extension frame being dependent upon said ways for guidance and support from the frame first mentioned, said ways including means for resisting the tilting movement of the extension frame when the extension frame is projected.

17. In a conveyor system, the combination with a first frame comprising side members and conveyor rollers spanning said frame and journalled on said side members, of guideway rollers mounted on the respective side members of the first frame below the conveyor rollers, an extension frame narrower than the frame first mentioned and having side members receivable between the side members of the first conveyor frame, the extension frame having conveyor rollers and adapted, when extended, to receive on its conveyor rollers work delivered from the end of the conveyor frame first mentioned, the side members of the extension frame riding on the guideway rollers of the first frame, and the first frame being provided with co-acting rollers above said guideway rollers and engaged with upper surfaces of the side members of the extension frame for holding said extension frame in alignment with the conveyor frame first mentioned and precluding it from tilting when extended, the extension frame being wholly dependent on the first mentioned frame for position and support.

18. In a conveyor system including a conveyor frame and an extension conveyor, the sub-combination which comprises a conveyor frame, a base therebeneath provided with a supporting wheel, link means pivoted to the base and to the conveyor frame, lever means connected with the base for the oscillation thereof on the link means, and an adjustable actuating connection for said lever means for effecting the movement thereof to control the position of the link means and thereby the elevation of the conveyor frame and the extension frame above the base.

19. The device of claim 18 in which the link means comprises parallel links pivoted at longitudinally spaced points to the conveyor frame and at corresponding points to the base.

20. The device of claim 18 in which the lever actuating means comprises a cable provided with sheaves mounting it upon the conveyor frame and having its ends connected with the lever.

JULIAN J. EBERLE.

REFERENCES CITED

The following references are of record in the file of this patent:

UNITED STATES PATENTS

| Number | Name | Date |
| --- | --- | --- |
| 556,934 | Koller | Mar. 24, 1896 |
| 1,404,591 | Fredrickson | Jan. 24, 1922 |
| 1,504,894 | McBride | Aug. 12, 1924 |
| 1,532,228 | Carpenter | Apr. 7, 1925 |
| 1,935,734 | Twomley | Nov. 21, 1933 |
| 1,959,735 | Phillips | May 22, 1934 |
| 2,438,527 | Werner | Mar. 30, 1948 |
| 2,445,960 | Mapes | July 27, 1949 |